United States Patent [19]

Yonezawa et al.

[11] Patent Number: 5,147,091

[45] Date of Patent: Sep. 15, 1992

[54] CLAMPING APPARATUS

[75] Inventors: Keitaro Yonezawa; Tsutomu Shirakawa, both of Kobe, Japan

[73] Assignee: Kabushiki Kaisha Kosmek, Hyogo, Japan

[21] Appl. No.: 798,908

[22] Filed: Nov. 27, 1991

[30] Foreign Application Priority Data

Nov. 29, 1990 [JP] Japan .................. 2-334507

[51] Int. Cl.$^5$ .............................................. B23Q 3/08
[52] U.S. Cl. .................................................. 269/137
[58] Field of Search ............... 269/32, 26, 137, 134, 269/157, 258

[56] References Cited

U.S. PATENT DOCUMENTS

| 641,886 | 1/1900 | Plangue | 269/258 |
| 3,595,112 | 7/1971 | De George | 269/137 |
| 4,506,871 | 3/1985 | Yonezawa . | |
| 4,772,000 | 9/1988 | Aubert | 269/137 |
| 4,932,640 | 6/1990 | Shirakawa . | |
| 5,071,109 | 12/1991 | Yonezawa . | |

FOREIGN PATENT DOCUMENTS

52-30371 8/1977 Japan .
55-1861 1/1980 Japan .

Primary Examiner—Robert C. Watson
Attorney, Agent, or Firm—Bacon & Thomas

[57] ABSTRACT

A clamping-member (7) is adapted to be straightly actuated from slantly above relative to a clamped surface (2a) of a clamped object (2) placed in front of a housing (4) and is provided with a clamping end surface (22) formed substantially in parallel to the clamped surface (2a). A shuttle member (21) for sliding is interposed between the clamped surface (2a) and the clamping end surface (22) and supported by the clamping end surface (22) so as to be slidingly movable within a certain extent in front and rear directions.

3 Claims, 7 Drawing Sheets

CLAMPING APPARATUS

BACKGROUND OF THE INVENTION

1. Field of the Invention

The present invention relates to a clamping apparatus adapted to clamp an object to be clamped or fixed (referred to as a clamped object hereinafter) such as a metal mould, a work pallet and the like onto a fixed table of a process machine such as an injection moulding machine, a machining center and so on, and more specifically to a clamping apparatus of the type including a clamping-member actuated straightly along an axis declining in a forward downward direction relative to a clamped surface of a clamped object placed in front of the clamping apparatus.

2. Description of Prior Art

Such a prior clamping apparatus is described in Japanese Patent Publication No. 52-30371 and Japanese Utility Model Publication No. 55-1861. According to each prior art, a clamping end surface of a clamping-member is adapted to be directly brought into contact with a clamped surface of a metal mould.

According to the aforementioned kind of clamping apparatus, at the end of the clamping actuation a small dynamical friction force takes effect between both the clamped surface of the metal mould and the clamping end surface of the clamping-member, and at the beginning of the unclamping actuation a large statical friction force takes effect between both those surfaces.

In order to prevent an obstruction to an unclamping actuation of the clamping apparatus from being caused by the large statical friction force, conventionally it is required to make the unclamping actuation force of the clamping apparatus stronger. As a result, the clamping apparatus becomes larger in size.

In order to attain a downsizing of the clamping apparatus, the inventors of the present invention proposed the following previous to the filing of the present invention. That is, a coefficient of friction between the clamped surface of the metal mould and the clamping end surface of the clamping-member was made smaller by covering the surface of the clamping-member with a sliding enhancement material such as a coating, a lubricant and the like so as to allow a reduction of the unclamping actuation force.

But, since such a sliding enhancement material tends to stick to the metal mould to be replaced and then removed thereby, its service life is extremely short, so that an improvement is required for ensuring the unclamping actuation of the hydraulic clamp.

Further, usually a finished accuracy of the clamped surface of the metal mould is different in the respective metal moulds to be replaced. In the case of a bad finished accuracy of the clamped surface, since a layer of the sliding enhancement material is readily broken, both the clamped surface and the clamping end surface tend to cause local seizures. As a result, it is apprehended that a coefficient of friction between both those becomes larger gradually and finally the clamping apparatus becomes incapable of effecting its unclamping actuation.

On the other hand, a technology for allowing the reduction of the unclamping actuation force, which has a basic construction different from that of the clamping apparatus with the inclined direct operated clamping-member according to the present invention, is described in U.S. Pat. No. 4,932,640 previously proposed by one of the inventors of the present invention. It employs a sliding member interposed between a wedge supporting surface formed in a housing of a wedge force-multification type hydraulic clamp and a sliding contact surface of a tightening wedge. But, since this wedge force-multification type hydraulic clamp is constructed so as to clamp a clamped object by means of a swinging actuation of its clamping-member, it doesn't suffer an abuse of abnormally increasing the coefficient of friction between the clamped object and the clamping-member.

SUMMARY OF THE INVENTION

It is an object of the present invention to provide a clamping apparatus with an inclined direct operated clamping-member, which enables the clamping apparatus to be manufactured in a small size and its unclamping actuation to be surely effected.

For accomplishing the above-mentioned object, the present invention is directed to improving a clamping-member of a clamping apparatus as follows.

A clamped surface of a clamped object and a clamping end surface of a clamping-member are disposed substantially in parallel to each other, and a sliding shuttle member is interposed between both these surfaces. This shuttle member is supported by the clamping end surface so as to be slidingly movable within a certain extent in forward and backward directions.

When the clamping-member is advanced forwardly and downwardly at the time of clamping actuation, firstly the shuttle member is brought into contact with the clamped surface of the clamped object from slantly above. In case that the coefficient of friction between the clamped surface and the shuttle member is abnormally large, the shuttle member is frictionally secured onto the clamped surface. Subsequently only the clamping-member slides forwardly downwardly keeping the shuttle member left behind and then the clamping-member serves to strongly press and fix the clamped object onto a fixed table through the shuttle member.

To the contrary, when the unclamping actuation is effected from the above-mentioned clamped condition, firstly a sliding is caused between the clamping-member and the shuttle member frictionally secured onto the clamped surface, then only the clamping-member is actuated backwardly upwardly keeping the shuttle member left behind. Subsequently, the shuttle member retracts together with the clamping-member actuated backwardly upwardly, so that the clamped object is changed over to the unclamped condition.

Since both the shuttle member and the clamping-member are component members of the clamping apparatus, differing from the clamped objects such as the metal mould and the like, their materials, finished accuracies and surface treatments are selected with large freedom respectively. Therefore, it is easy to decrease the coefficient of friction between the sliding surfaces of both the object and the member. Accordingly, the unclamping actuation force can be small and the clamping apparatus can be manufactured in a small size.

Further, since the sliding surfaces of both the object and the member don't suffer from the removal of the sliding enhancement material such as the coating and the lubricant by the clamped object, the coefficient of friction therebetween can be kept small for a long time. Accordingly, it becomes possible to reliably effect the unclamping actuation of the clamping apparatus for a long time.

Incidentally, in the above-mentioned construction, the surface hardness of the shuttle member is preferably set at a larger value than those of the clamped object and the clamping end surface for preventing seizures.

Further, it is preferable to keep the shuttle member in a forwardly resiliently urged condition by a resilient means such as a spring and the like relative to the clamping-member. Under that condition, it becomes possible to return the shuttle member to the front position by means of the resilient means at the end of unclamping actuation, so that the clamping apparatus can be prepared automatically for its next clamping actuation.

Since the present invention is constructed and functions as mentioned above, the following advantages can be obtained.

Since the clamping apparatus can have its unclamping actuation force made small by the interposition of the shuttle member, the unclamping spring can be downsized in the case of a single acting spring return type as well as a sectional area of the unclamping actuation fluid chamber can be decreased in the case of a fluid return type spring clamp or a double acting type one. As a result, the clamping apparatus can be manufactured in a small size. Further, since the sliding enhancement material is not removed from both the sliding surfaces of the shuttle member and the clamping-member, a good condition of a small coefficient of friction can be maintained for a long time and as a result the unclamping actuation can be reliably effected for a long time.

When summarizing the above, the clamping apparatus can effect the unclamping actuation reliably though it is manufactured in a small size.

Further, as noted above, since the coefficient of friction between the clamped object and the clamping-member can be kept at a small value owing to the interposition of the shuttle member at the end of clamping actuation, it becomes possible to prevent an unexpected shifting of the clamped object at that time and to improve a finishing accuracy of a process machine such as an injection moulding machine and the like.

The above and other advantages of the present invention will be better understood from the following detailed description of preferred embodiments of the invention, made with reference to the accompanying drawings, in which:

BRIEF DESCRIPTION OF THE DRAWINGS

FIGS. 1 through 16 show embodiments of the present invention;

FIGS. 1 through 7 show a first embodiment thereof;

FIGS. 8 through 15 show variants of the first embodiment;

FIGS. 9 and 10 show a second variant thereof;

FIGS. 11 and 12 show a third variant thereof;

FIGS. 13 through 15 show a fourth variant thereof;

DESCRIPTION OF THE PREFERRED EMBODIMENTS

Preferred embodiments of the present invention will be explained with reference to attaching drawings hereinafter.

First Embodiment

FIGS. 1 through 7 show a first embodiment.

Figure 1:
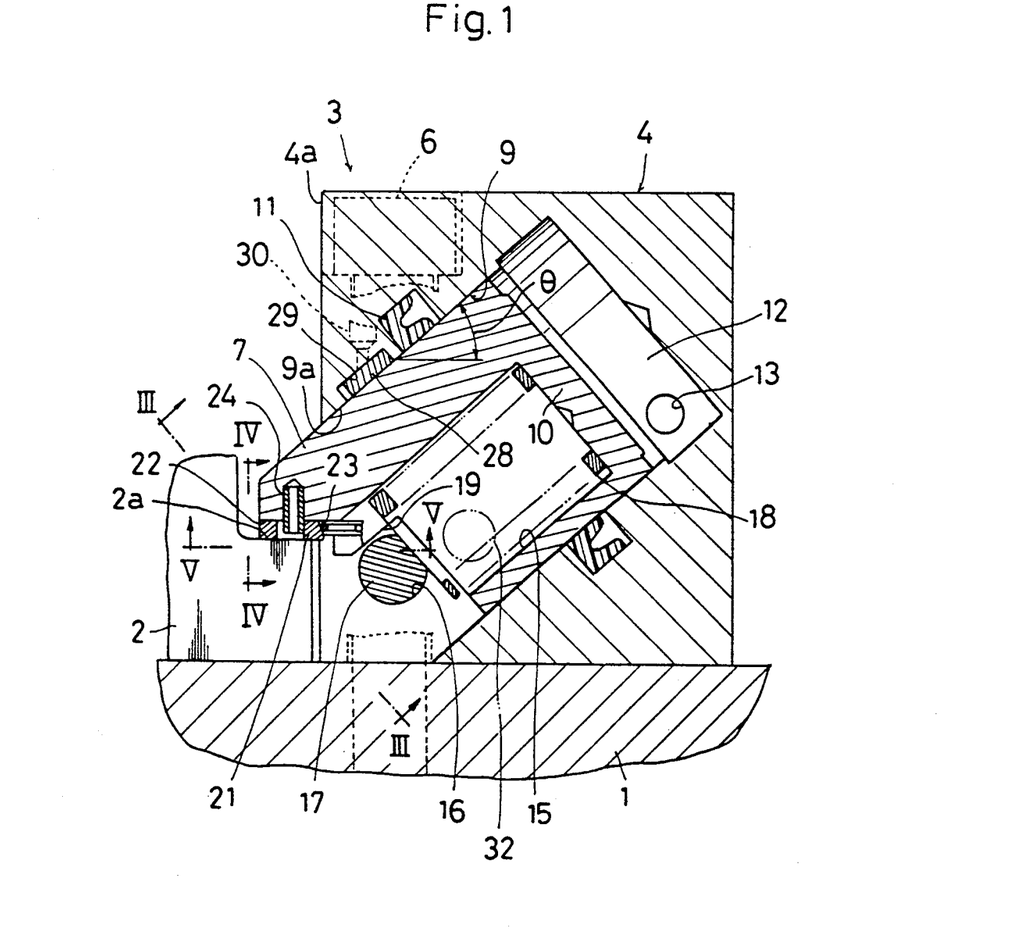
FIG. 1 is a vertical sectional side view of a hydraulic clamp taken along the section line I—I in FIG. 2.
Figure 2:
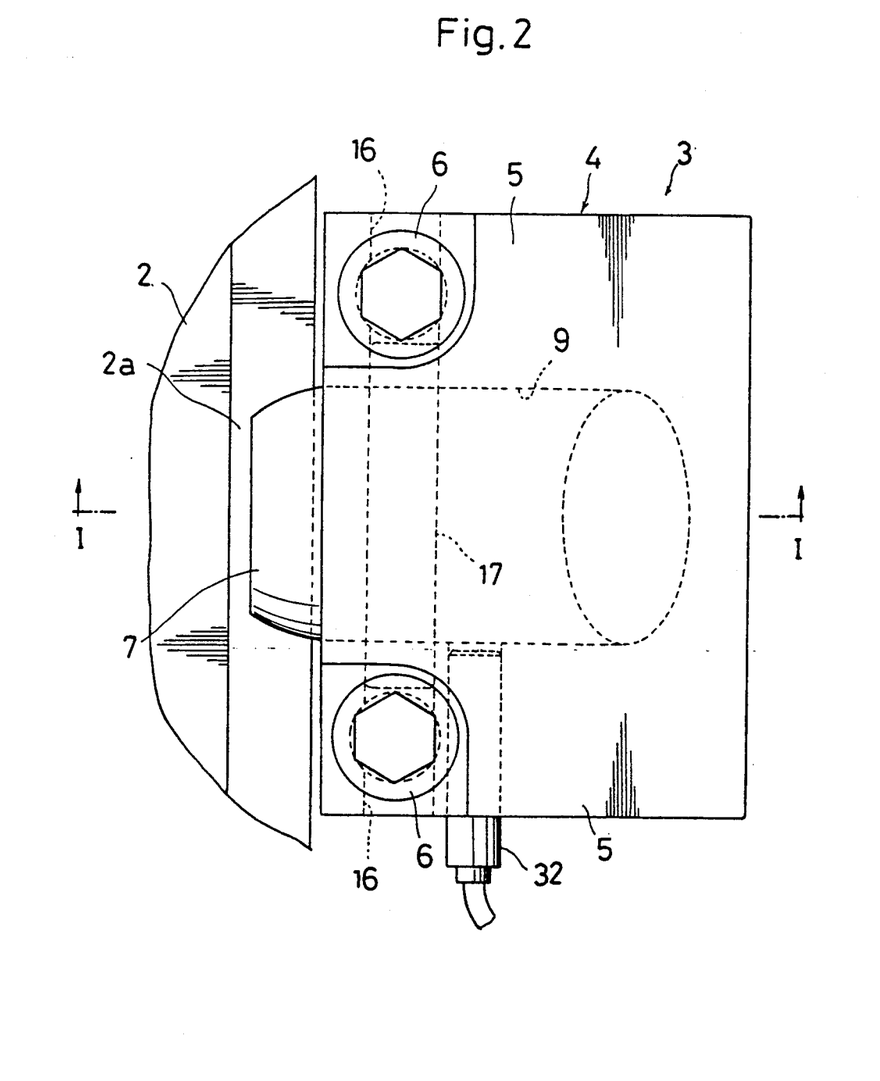
FIG. 2 is a plan view of the hydraulic clamp.
Figure 3:
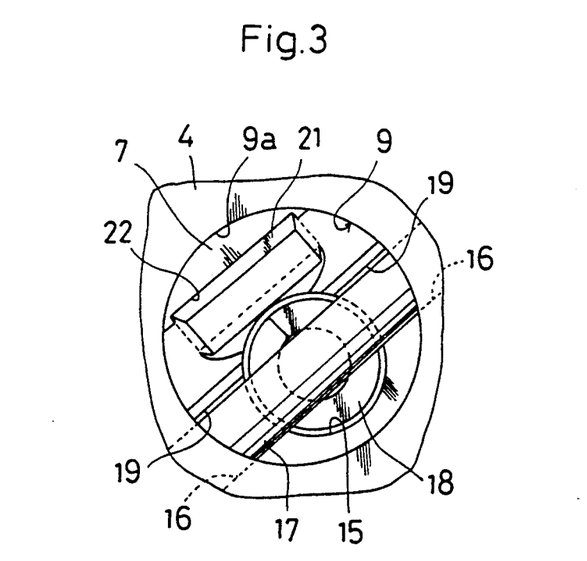
FIG. 3 is a view taken along the arrow line III—III in FIG. 1.
Figure 4:
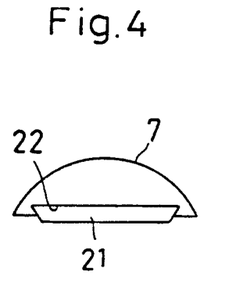
FIG. 4 is a view taken along the arrow line IV—IV in FIG. 1.
Figure 5:
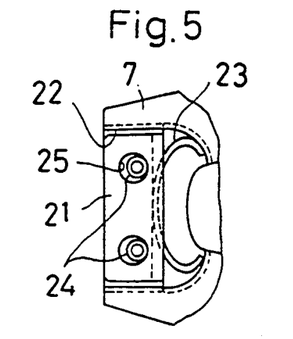
FIG. 5 is a view taken along the arrow line V—V in FIG. 1.

A metal mould 2 generally referred to as a clamped object is clamped onto a fixed table 1 of an injection moulding machine by means of a hydraulic clamp 3 of the single acting spring return type. The hydraulic clamp 3 has a housing 4 fixedly secured at its paired side walls 5.5 to the fixed table 1 by means of two bolts 6.6 and a clamping-member 7 adapted to be advanced from the housing 4 so as to press the clamped surface 2a of the metal mould 2 from slantly above.

That is, a cylinder bore 9 is formed in the housing 4 so as to extend in a forwardly downwardly declining direction. An inclination angle $\theta$ of the cylinder bore 9 is set at 40 degrees herein, but it may be from 10 to 45 degrees. A piston 10 is inserted in fluid tight relationship into the cylinder bore 9 through a U-packing 11. A clamping actuation hydraulic chamber 12 is formed therein so as to face the rear side of the piston 10. An oil supply and discharge port 13 communicates with the clamping actuation hydraulic chamber 12. An upper portion 9a of the surrounding surface of the cylinder bore 9 opens at a front surface 4a of the housing 4. The clamping-member 7 is formed by a direct protruding part of the upper portion of the piston 10 extending from its front end and guided by the upper portion 9a of the surrounding surface of the cylinder bore 9.

A spring accommodation recess 15 is formed in the piston 10 in such a manner as to extend backwardly from the front end of the clamping-member 7. An axis of the spring accommodation recess 15 is arranged to lie below an axis of the cylinder bore 9. Pin insertion holes 16.16 are transversely formed in the front lower portions of the opposite side walls 5.5 of the housing 4. A spring retaining pin 17 is so disposed as to cross over both the clamping-member 7 and the spring accommodation recess 15, and its opposite end portions are supported by the pair of pin insertion holes 16.16. The spring retaining pin 17 is anchored by means of both the bolts 6.6. An unclamping spring 18 is installed between the rearmost position of the spring accommodation recess 15 and the spring retaining pin 17. Incidentally, the clamping-member 7 is provided at its left and right walls with admittance grooves 19.19 so formed as to open in its front end for preventing an interference with the spring retaining pin 17.

A first shuttle member 21 of the sliding type is interposed between the clamped surface 2a of the metal mould 2 and the clamping-member 7 so as to be slidingly movable within a certain extent in front and rear directions. That is, a shuttle supporting groove 22 as the clamping end surface is so formed in the front lower surface of the clamping-member 7 as to open downwardly (refer to FIG. 4). The first shuttle member 21 inserted into the supporting groove 22 is urged forwardly by a C-shaped spring 23 as a resilient means and adapted to be blocked by two stop pins 24 from moving forwardly beyond a certain distance. Large through-holes 25.25 are formed in the first shuttle member 21, corresponding to the respective stop pins 24.

The first shuttle member 21 is manufactured from a harder material than those for the metal mould 2 and the clamping-member 7. That is, a hard material obtained by applying a heat treatment or a nitriding treatment to an alloy metal is used for the first shuttle member 21. In this case, it is enough that only the upper and lower surfaces or only the surface of the first shuttle member 21 are harder than the clamped surface 2a and the shuttle supporting groove 22. Further, a surface treatment such as a coating, a plating and the like is applied to such a hard material so as to increase its sliding capability. Incidentally, in order to provide a smoother sliding between the first shuttle member 21 and the clamping-member 7, a lubricant such as grease, molybdenum disulfide and the like is preferably applied to the sliding surfaces of both those members.

Further, between the upper portion 9a of the surrounding surface of the cylinder bore 9 and the upper portion of the surrounding surface of the clamping-member 7 a second shuttle member 28 of the sliding type is so installed as to be slidingly movable within a certain extent in the front and rear directions. The second shuttle member 28 is manufactured substantially similarly to the first shuttle member 21. By the way, a grease fill-up port 30 is opened in a second shuttle member accommodation groove 29 formed in the housing 4.

The coefficient of friction between the clamping-member 7 and the housing 4 becomes smaller owing to the provision of the second shuttle member 28. As a result, the unclamping actuation force becomes smaller accordingly.

A proximity switch 32 for detecting the clamped and the unclamped conditions is located in the side wall 5 of the housing 4 so as to face the cylinder bore 9.

Figure 6:
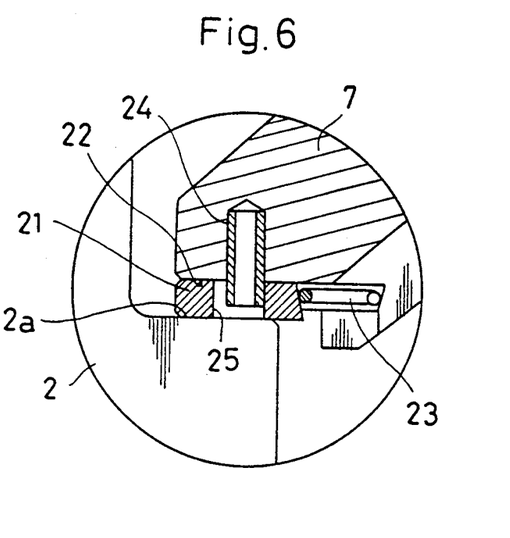
FIG. 6 is an enlarged partial view of FIG. 1; showing a clamping transient condition.
Figure 7:
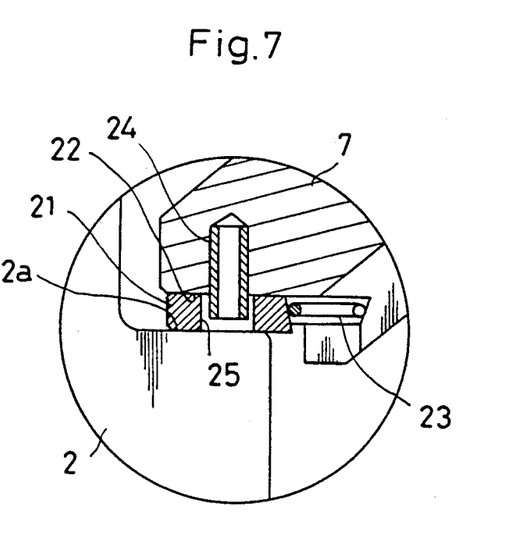
FIG. 7 is a view corresponding to FIG. 6 and showing a clamped condition.

The operation of the hydraulic clamp will be explained with reference to FIG. 1 and FIGS. 6 and 7. FIG. 6 is an enlarged partial view of FIG. 1 and shows a clamping transient condition. FIG. 7 shows a clamped condition, but otherwise corresponding to FIG. 6.

At the time of changeover from the unclamped condition to the clamped condition, a pressurized oil is supplied to the clamping actuation hydraulic chamber 12. Thereupon, the piston 10 is actuated to extend forwardly by means of the hydraulic pressure so as to advance the clamping-member 7 forwardly downwardly. Thus, as shown in FIG. 1 and FIG. 6, the lower surface of the first shuttle member 21 is brought into contact with the clamped surface 2a of the metal mould 2 from slantly above. Subsequently, when the piston 10 is further actuated to extend forwardly, as shown in FIG. 7, a sliding is caused between the first shuttle member 21 frictionally secured onto the clamped surface 2a and the supporting groove 22 formed as the clamping end surface of the clamping-member 7 so that only the clamping-member 7 can be driven forwardly downwardly keeping the first shuttle member 21 left behind. Thus, the metal mould 2 is strongly pressed and fixedly secured onto the fixed table 1 by means of the clamping-member 7.

To the contrary, at the time of changeover from the clamped condition shown in FIG. 7 to the unclamped condition, the operation is as follows.

When the pressurized oil is discharged from the clamping actuation hydraulic chamber 12, the piston 10 is actuated by means of the resilient force of the unclamping spring 18 so as to retract backwardly upwardly. Thereupon, as shown in FIG. 6, firstly a sliding is caused between the first shuttle member 21 frictionally secured onto the clamped surface 2a and the supporting groove 22 so that only the clamping-member 7 can be retracted backwardly upwardly keeping the first shuttle member 21 left behind. Subsequently, when the clamping-member 7 and the first shuttle member 21 are actuated backwardly upwardly for unclamping by means of the further backwardly actuated piston 10, the metal mould 2 is unclamped.

Incidentally, in the case that a height dimension of the clamped surface 2a of the metal mould 2 becomes larger so that a thickness to be clamped becomes larger correspondingly, height adjustment adapter plates (not illustrated) are to be interposed according thereto between the lower surface of the housing 4 and the fixed table 1 so that it becomes possible to readily consider a countermeasure for a change of the thickness to be clamped.

FIGS. 8 through 15 show first through fourth variants.

First Variant

Figure 8:
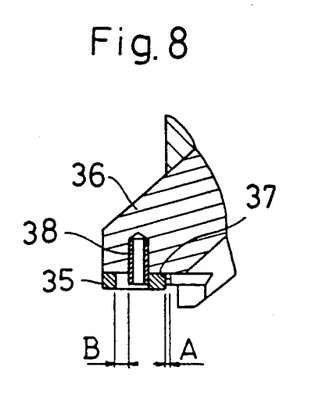
FIG. 8 shows a first variant thereof and otherwise corresponds to FIG. 6.

FIG. 8 shows a first variant.

A clamping-member 36 is provided with a stop wall 37 facing a rear surface of a first shuttle member 35. A stop gap A for the stop wall 37 is set at a smaller value than a play gap B for the first shuttle member 35. Thus, even if an advancement distance of the clamping-member 36 becomes too large relative to the first shuttle member 35 due to any reason when the clamping-member 36 is changed over from the clamping transient condition to the clamped condition, the stop wall 37 is brought into contact with the first shuttle member 35 earlier than the stop pin 38 to prevent a damage of the stop pin 38.

Second Variant

Figure 9:
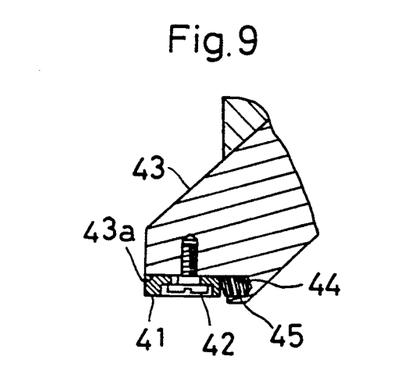
FIG. 9 is a view corresponding to FIG. 8.
Figure 10:
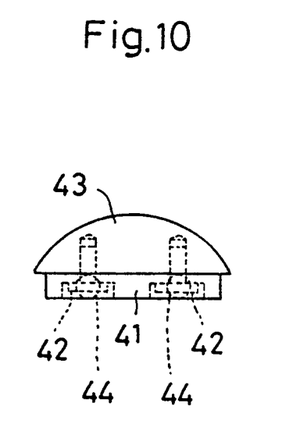
FIG. 10 is a left side view of FIG. 9.

FIGS. 9 and 10 show a second variant.

In this case, the aforementioned shuttle supporting groove is omitted and a first shuttle member 41 is secured to a clamping-member 43 by means of two bolts 42. The symbol 43a designates a clamping end surface. Compression coil springs 45.45 as a resilient means are inserted into two spring accommodation recesses 44.44 formed in the clamping-member 43. The first shuttle member 41 is resiliently urged forwardly by means of these compression springs 45.

Third Variant

Figure 11:
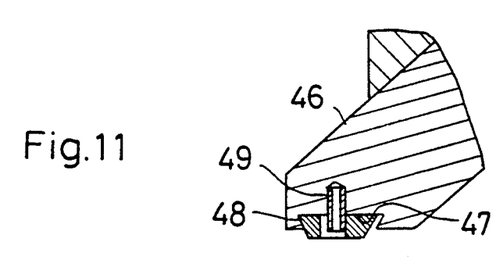
FIG. 11 is a view corresponding to FIG. 8.
Figure 12:
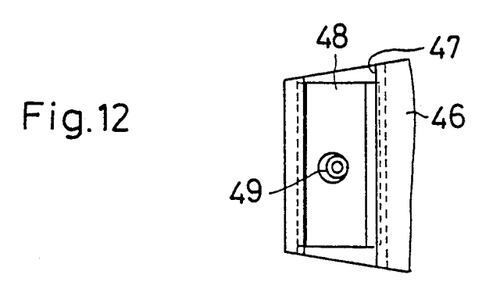
FIG. 12 is a bottom view of FIG. 11.

FIGS. 11 and 12 show a third variant.

In this case, a shuttle supporting groove 47 as the clamping end surface is transversely formed in the lower surface of a clamping-member 46. A first shuttle member 48 is inserted into the supporting groove 47 so as to be slidingly movable in the front and rear directions. The symbol 49 designates a stop pin.

Fourth Variant

Figure 13:
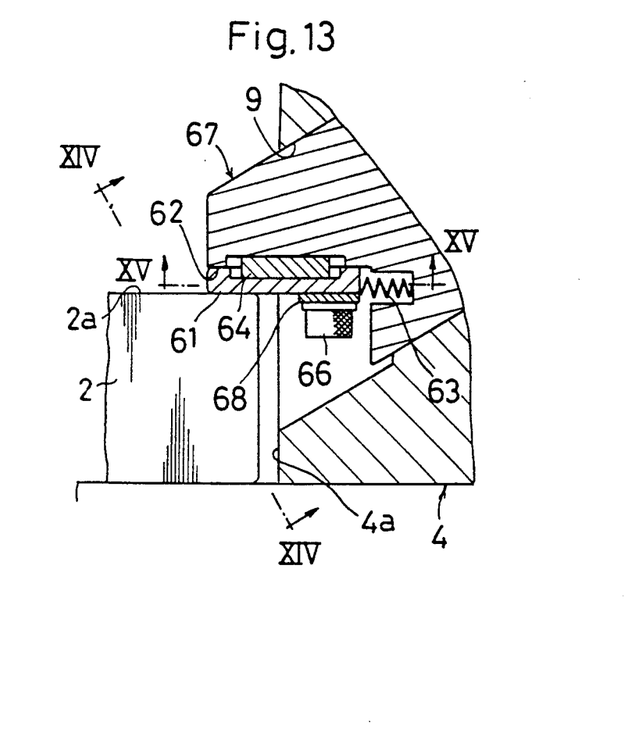
FIG. 13 is a view corresponding to FIG. 6.
Figure 14:
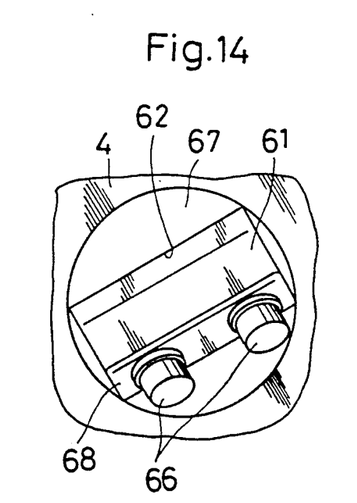
FIG. 14 is a view taken along the arrow line XIV—XIV in FIG. 13.
Figure 15:
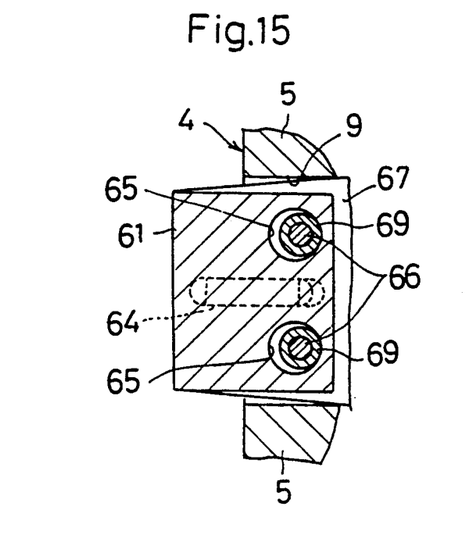
FIG. 15 is a sectional view taken along the section line XV—XV in FIG. 13.

FIGS. 13 through 15 show a fourth variant.

A first shuttle member 61 is interposed between the clamped surface 2a of the metal mould 2 and a clamping end surface 62 of a clamping-member 67 so as to be slidingly movable in the front and rear directions through a key 64. The shuttle member 61 is resiliently urged forwardly by means of a coil spring 63. Thereupon, the shuttle member 61 is restrained by means of a pair of stop bolts 66.66 put into large through-holes 65.65 so as not to move forwardly beyond a certain extent. The symbol 68 designates a support plate, and the symbol 69 designates a sleeve.

Second Embodiment

Figure 16:
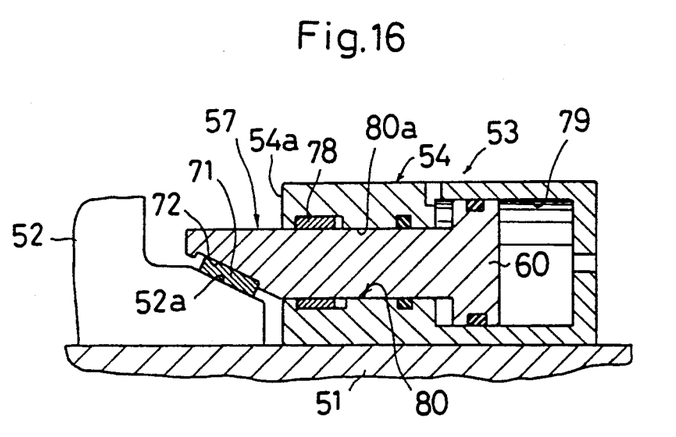
FIG. 16 shows a second embodiment of the invention and is a vertical sectional side view of the hydraulic clamp.

FIG. 16 shows a second embodiment of the invention.

A hydraulic clamp 53 is of the double acting type. A cylinder bore 79 of a large diameter and a rod bore 80 of a small diameter are formed in series within a housing 54, and a piston 60 and a clamping-member 57 are inserted into these bores 79.80 in parallel to a fixing surface of a fixed table 51. A clamped surface 52a of a metal mould 52 is formed as a backwardly downwardly declining surface. Corresponding thereto, also a front lower portion of the clamping-member 57 is provided with a backwardly downwardly declining surface, in which a shuttle supporting groove 72 is formed as a clamping end surface. A first shuttle member 71 is supported by the supporting groove 72 so as to be slidingly movable in the front and rear directions. A second shuttle member 78 is formed in an annular configuration and externally fitted around a mid way portion of the clamping-member 57 in the front and rear direction. Incidentally, the second shuttle member 78 may be formed in such a configuration as to be inserted only between the upper portion 80a of the surrounding surface of the rod bore 80 and the upper portion of the surrounding surface of the clamping-member 57 instead of the annular configuration.

The above-mentioned embodiments may be modified as follows.

The clamping apparatus may be a fluid pressure clamp such as a pneumatic clamp and the like instead of the hydraulic clamp.

The type of the clamp may be a fluid pressure returned type spring clamp besides the spring returned type fluid pressure clamp and the double acting type clamp.

Further, the second shuttle member 28.78 may be accommodated within the clamping-member instead of within the housing 4.54.

As many different embodiments of the invention will be obvious to those skilled in the art, some of which have been disclosed or referred to therein, it is to be understood that the specific embodiments of the invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A clamping apparatus comprising:
   a housing (4, 54) having a front surface (4a, 54a);
   a clamping-member (7, 36, 43, 46, 67, 57) adapted to be linearly actuated from slantly above relative to a clamped surface (2a, 52a) of a clamped object (2, 52) placed in front of said front surface (4a, 54a) and provided with a clamping end surface (22, 47, 62, 72) substantially in parallel to said clamped surface (2a, 52a);
   a shuttle member (21, 35, 41, 48, 61, 71) for sliding interposed between said clamped surface (2a, 52a) and said clamping end surface (22, 47, 62, 72) and so supported by said clamping end surface as to be slidingly movable within a certain extent in front and rear directions; and
   resilient means (23, 45, 63) for resiliently urging said shuttle member (21, 35, 41, 48, 61, 71) forwardly relative to said clamping-member (7, 36, 43, 46, 67, 57).

2. A clamping apparatus as claimed in claim 1, wherein
   at least surface hardness of said shuttle member (21, 35, 41, 48, 61, 71) is set at a larger value than each surface hardness of said clamped surface (2a, 52a) and said clamping end surface (22, 47, 62, 72).

3. A clamping apparatus as claimed in claim 1, wherein said housing (4, 54) has a bore (9, 80) for accommodating said clamping-member (7, 36, 43, 46, 67, 57),
   between at least an upper portion (9a, 80a) of a surrounding surface of said bore (9, 80) and said clamping-member another shuttle member (28, 78) si disposed so as to be slidingly movable within a certain extent in the front and rear directions.

* * * * *